United States Patent [19]
Helm et al.

[11] 4,300,664
[45] Nov. 17, 1981

[54] LOCKING DEVICE

[75] Inventors: James D. Helm; Walter G. Gellerson, both of Yakima, Wash.

[73] Assignee: Decoto Aircraft, Inc., Yakima, Wash.

[21] Appl. No.: 80,995

[22] Filed: Oct. 1, 1979

Related U.S. Application Data

[63] Continuation of Ser. No. 963,844, Nov. 27, 1978, abandoned.

[51] Int. Cl.[3] ....................... F16D 65/22; F16D 51/12
[52] U.S. Cl. ....................................... 188/265; 92/24; 188/67
[58] Field of Search ...................................... 92/24–26; 188/67, 265; 244/115; 303/89

[56] References Cited

U.S. PATENT DOCUMENTS 2,851,995 9/1958 Westcott .......................... 303/89 X
2,971,497 2/1961 De Vost .................................. 92/24
3,314,335 4/1967 Gulick ..................................... 92/26
3,813,065 5/1974 Hallesy et al. ...................... 244/115

FOREIGN PATENT DOCUMENTS 927256 5/1963 United Kingdom .

*Primary Examiner*—Duane A. Reger
*Attorney, Agent, or Firm*—William W. Haefliger

[57] ABSTRACT

A mechanical locking device includes multiple components that must move before axial travel of a load exerting component becomes unblocked. Such elements include a main lock means that is radially movable to unblock said axial travel; axially movable holder means that blocks radial movement of the main lock means; radially movable trigger means that blocks axial movement of the holder means; and release structure blocking radial movement of the trigger means. At least one and preferably both of the main lock means and of the trigger means comprises multiple elements spaced apart about the device axis for independent radial movement, such elements typically being caged for such independent movement.

13 Claims, 13 Drawing Figures

LOCKING DEVICE

This is a continuation of application Ser. No. 963,844, filed Nov. 27, 1978, now abandoned.

BACKGROUND OF THE INVENTION

This invention relates generally to the release of relatively high, locked loads, and more particularly concerns apparatus to suddenly release a high level dynamic or static load without damage to the locking member.

Prior load locking devices capable of sudden release have typically employed a locking ring contained in a relatively movable member that engages a groove or inclined surface in a relatively stationary member. A ram or piston is usually inserted into one of these members to force the lock ring into the groove, or against the inclined surface, and to unlock the movable member the ram is axially displaced. Under a high load at release, the locking ring must move radially to free itself from the groove or receptacle before the area of the lock interface can approach zero, and in single element locks this necessary radial acceleration cannot be achieved, which consequently results in high wear damage or failure of the locking member.

U.S. Pat. No. 3,813,065 discloses the use of a one-piece, split, chamfered and notched locking ring as a locking member between the load carrying members; and in that device the application of predetermined loads to the load carrying members releases the locking ring by flexure of the ring. In practice, problems and disadvantages can and do arise with the device of that patent. Such problems include the necessity that the ring flex, which increases the wear facter due to inadequate hardening; the ring can take a permanent set in use which produces a problem with adequate locking; and an out-of-round condition of the ring leads to difficulty with adequate ring collapse. Further, the chamfered and notched ring is difficult to produce, and the overall structure is found to be less than desirably rugged.

SUMMARY OF THE INVENTION

It is a major object of the invention to provide an improved releasable locking device of exceptionally rugged and simple construction, and which eliminates the need for the above described flexible locking ring.

Basically, the device comprises:

(a) main lock means blocking axial travel of a load exerting component, and being generally radially movable to unblock such axial travel, (b) holder means blocking such general radial movement of the main lock means, and being axially movable to unblock that generally radial movement of the main lock means, (c) triggering means blocking such axial movement of the holder means, and being generally radially movable to unblock that axial movement of the holder means, and (d) release structure blocking such generally radial movement of the triggering means, and being movable to unblock generally radial movement of the triggering means, (e) at least one of the main lock means and the triggering means comprising multiple elements spaced about the axis for independent radial movement.

As will be seen, the main lock means typically includes first locking elements or segments spaced about the axis and which are independently radially movable to unlock axial travel of the load exerting component; and the triggering means typically includes second locking elements or segments blocking axial movement of the holder means in the form of a sleeve, the second elements also being independently radially movable to unblock axial movement of the holder sleeve. Further, a first retainer is provided to define slots spaced about the axis and in which the first elements are located or caged for radial movement, and a second retainer is also provided to define slots spaced about the axis and in which the second elements are located or caged for radial movement, such retainers extending axially oppositely toward one another.

As a result, the overall structure is simplified and made extremely rugged; and also the elements or segments can independently adjust to load conditions and tolerances which they encounter, and symmetry is maintained. Further, such elements need not flex and can consequently be hardened sufficiently to reduce wear to acceptable levels; they do not take a permanent set in use; and out-of-round problems are eliminated.

These and other objects and advantages of the invention, as well as the details of an illustrative embodiment, will be more fully understood from the following description and drawings, in which:

DRAWING DESCRIPTION

DETAILED DESCRIPTION

Figure 1:
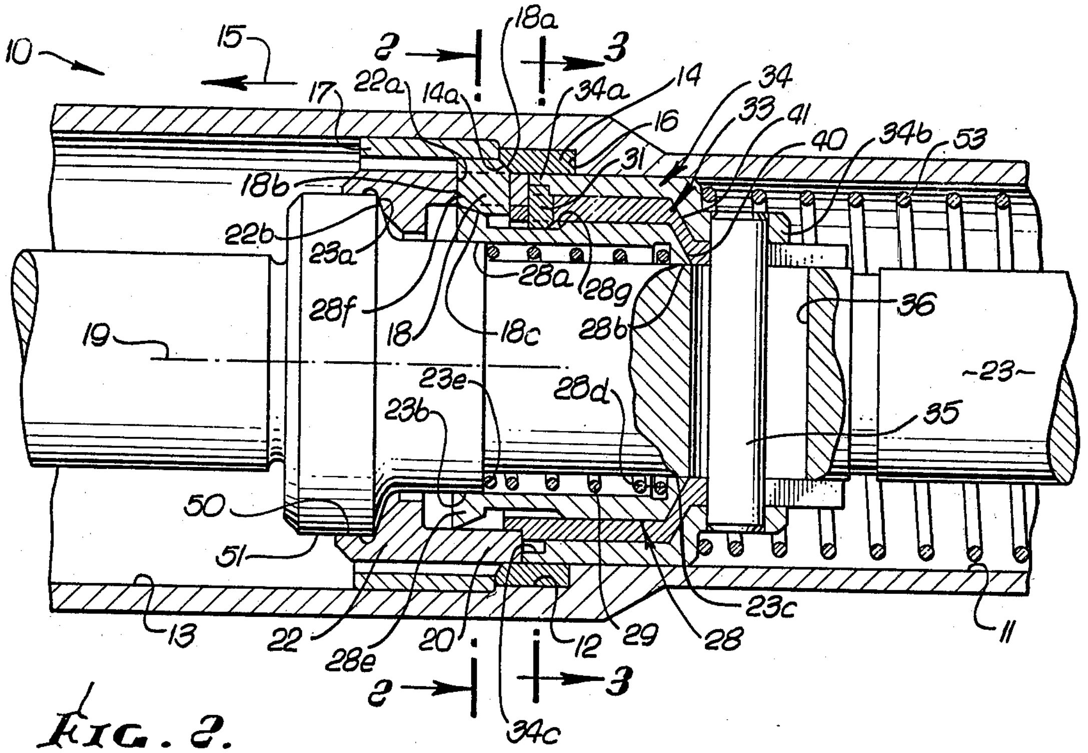
FIG. 1 is a vertical section through a locking device embodying the invention, the device being in locked condition.
Figure 2:
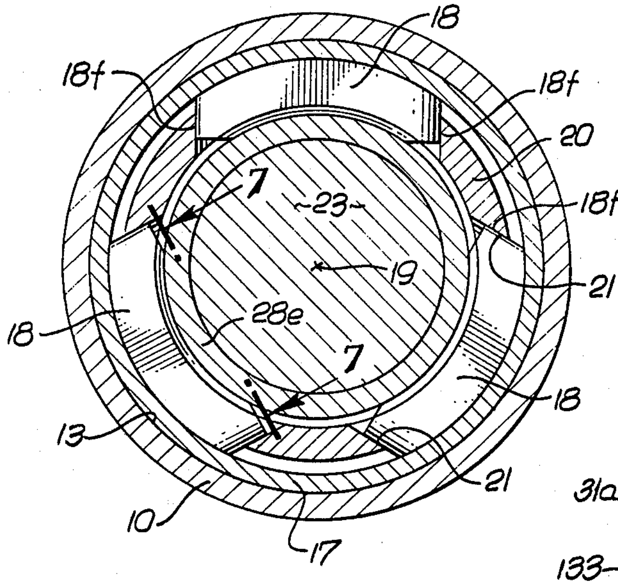
FIG. 2 is a section taken on lines 2—2 of FIG. 1.
Figure 3:
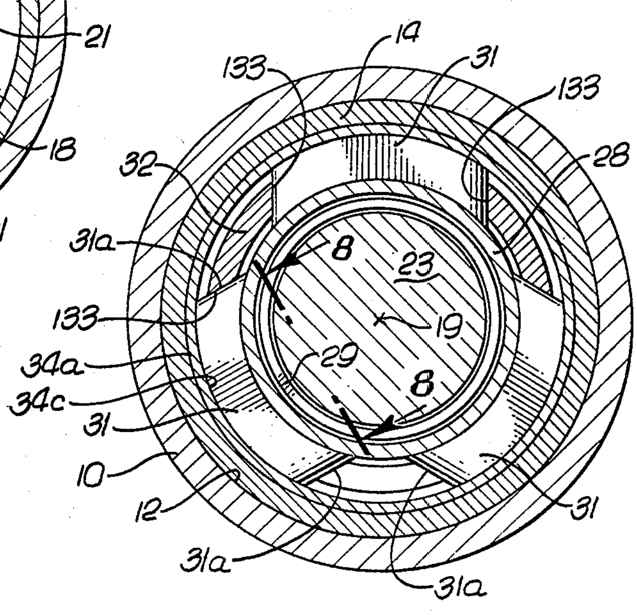
FIG. 3 is a section taken on lines 3—3 of FIG. 1.

In FIGS. 1-6 a cylinder assembly 10 includes a cylinder having stepped bores indicated at 11—13. Assembly 10 is shown to include a load exerting component in the form of a ring shaped seat 14, the leftward axial direction of the load shown at 15. Seat 14 fits in bore 12 and against bore shoulder 16. An annular spacer 17 fits in bore 13 and against the left end of the seat.

Main lock means is provided to block (in FIG. 1) axially leftward travel of the component 14 along with the cylinder 10 and spacer 17. That main lock means advantageously includes multiple first elements or lock segments 18 spaced about axis 19 and being radially independently movable in slots defined by a first retainer 20. The slot walls are indicated at 21 in FIG. 2, and three such segments are provided with side walls 18*f* engaging the retainer slot walls acting as radial guides and which also extend in the direction of axis 19. The retainer 20 is formed integrally with an annular thrust bearing 22, which cooperates with the lock segments 18 in FIG. 1 to transmit axial loading from the component 14 to a piston 23 received within the cylinder 10. In this regard, component 14 has a frusto-conical surface 14*a* that engages and transmits loading to corresponding surfaces 18*a* of segments 18; the latter have radially extending surfaces 18*b* that engage and transmit loading to corresponding end surfaces 22*a* of the thrust bearing 22; and the latter has a surface 22*b* that engages and transmits loading to corresponding surfaces 23*a* of piston 23.

Holder means is provided to block radially inward movement of the main lock means (i.e. segments 18 in the example), the holder means being axially movable to unblock that radial inward movement of the segments, thereby to unblock leftward relative axial travel of the cylinder assembly 10. In the example, the holder means comprises a load transfer sleeve 28 having bore surfaces 28*a* and 28*b* in sliding guided engagement with the external cylindrical surfaces 23*b* and 23*c* of the piston. A compression spring 29 between the shoulder 23*e* and surface 28*d* engages sleeve surface 28*d* and urges the sleeve to the right.

Figure 4:
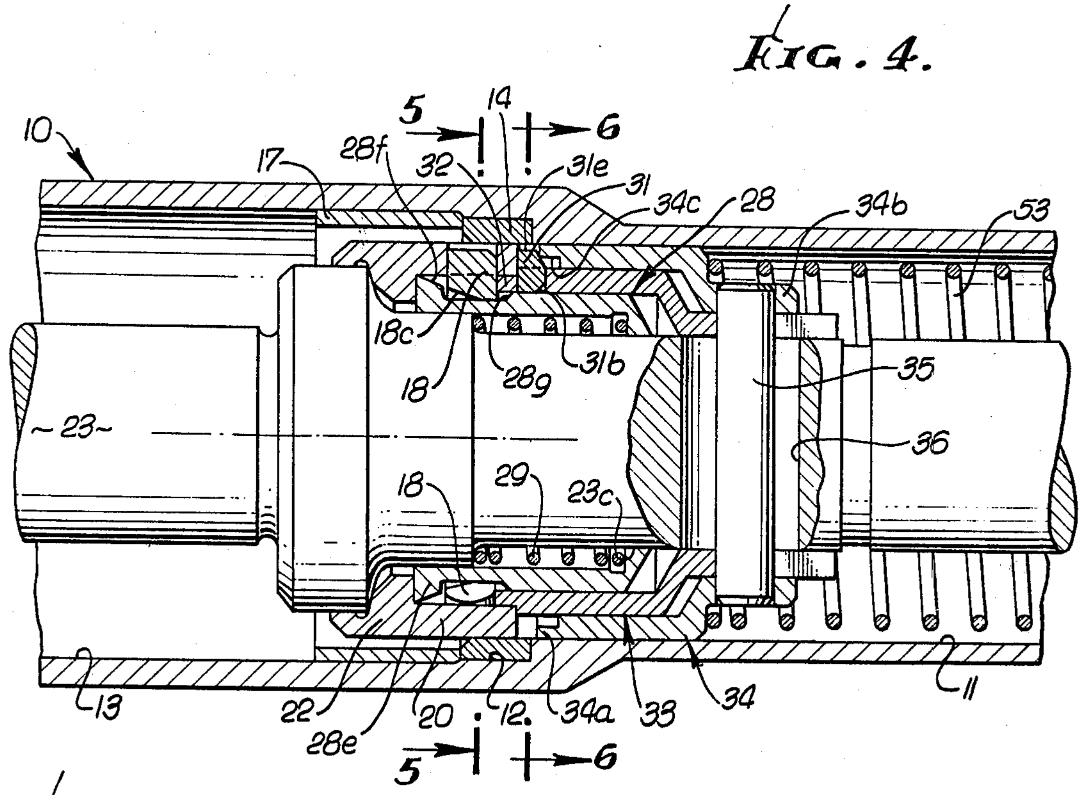
FIG. 4 is a vertical section like FIG. 1, but showing the device in unlocked condition.
Figure 5:
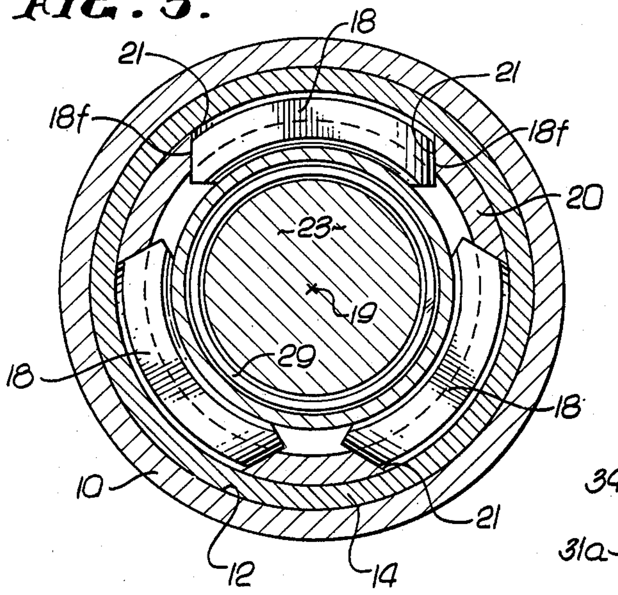
FIG. 5 is a section taken on lines 5—5 of FIG. 4.
Figure 6:
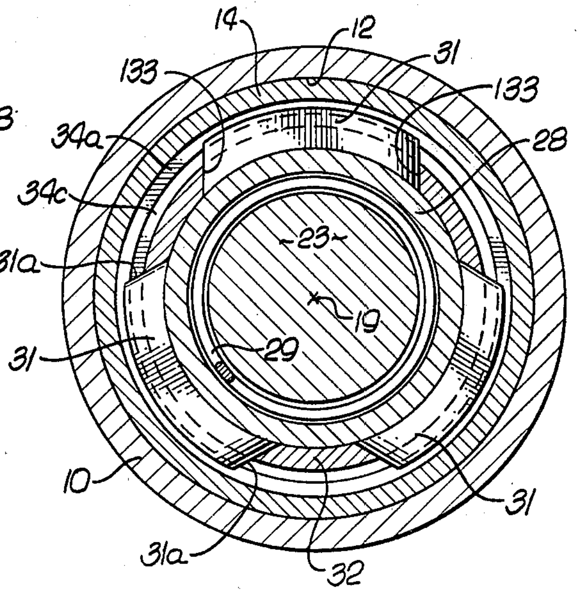
FIG. 6 is a section taken on lines 6—6 of FIG. 4.
Figure 7:
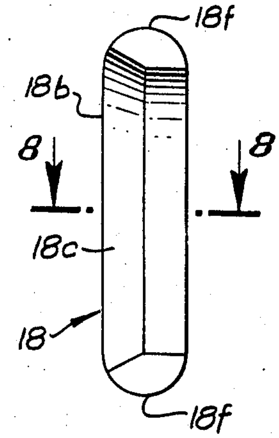
FIG. 7 is a radial view of one of a group of first locking elements or segments as used in FIGS. 1 and and 4.
Figure 8:
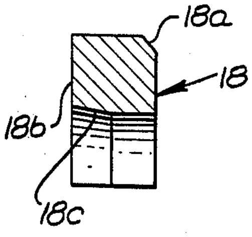
FIG. 8 is a section on lines 8—8 of FIG. 7.
Figure 9:
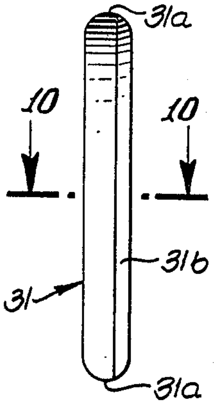
FIG. 9 is a radial view of one of a group of second locking element or segments as used in FIGS. 1 and 4.
Figure 10:
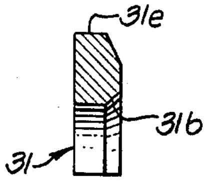
FIG. 10 is a section on lines 10—10 of FIG. 10.
Figure 11:
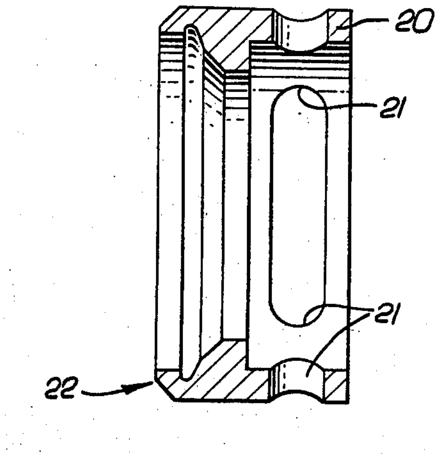
FIG. 11 is a vertical axial section through a thrust bearing, and first segment retainer, as used in FIGS. 1 and 4.
Figure 12:
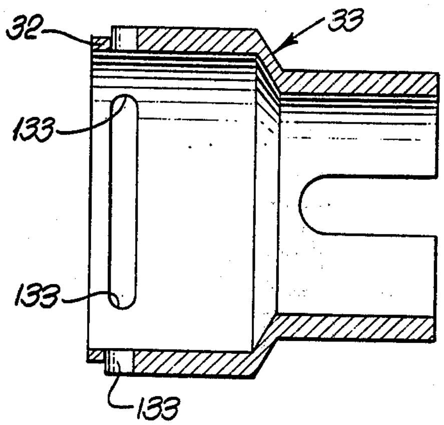
FIG. 12 is a vertical axial section through a second segment retainer as used in FIGS. 1 and 4.

The holder sleeve 28 is axially movable to the left to unblock radially inward movement of the segments, as will be explained. In this regard, the segments have rightwardly tapering frusto-conical shoulders 18*c* that engage corresponding frusto-conical annular shoulder 28*f* on the sleeve flange 28*e*, and that are relatively shiftable in response to sleeve leftward axial movement to enable unblocking of radially inward movement of the segments 18. Thus for example when the sleeve is free to be moved to the left, the radially inward force components exerted by the segments 18 on the sleeve shoulder 28*f* are sufficient to drive the sleeve to the left, compressing the spring 29, as seen in FIG. 4.

Triggering means is also provided to block axially leftward movement of the sleeve 28, the triggering means being radially movable to unblock such axial movement of that sleeve. In the example, the triggering means includes multiple second elements or segments 31 which are independently movable radially outwardly to unblock axial movement of the sleeve as described. Those second segments are spaced about axis 19 and are movable in slots defined by a second retainer 32. The slot walls are indicated at 133 in FIG. 3, and three such second segments are provided with side walls 31*a* engaging the retainer slot walls acting as radial guides, and which also extend in the direction of axis 19. The retainer 32 is formed integrally with a retainer ring 33 extending closely about sleeve 28. In this regard, the sleeve 28 and the segments 31 have second frusto-conical interengagement shoulders which are relatively shiftable in response to radially outward movement of the segments, to enable sleeve leftward movement as described. See for example leftward tapering frusto-conical shoulder 28*g* on the sleeve to engage corresponding shoulders 31*b* on the segments 31. Leftward force transmission to the sleeve, as by the segments 18 is sufficient to displace the segments 31 radially outwardly when the latter segments are free to move outwardly.

Figure 13:
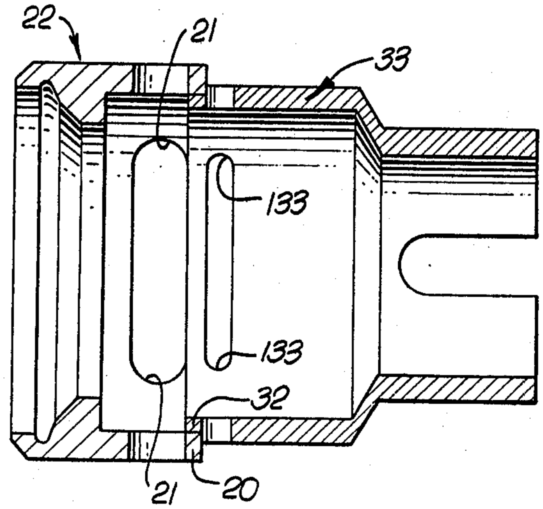
FIG. 13 is a vertical axial section through the FIGS. 11 and 12 retainers, in assembled relation.

It will be noted that the first and second retainers 20 and 32 are in the form of cages for their respective "caged" segments 18 and 31, and that they extend axially oppositely toward one another and into vertical proximity as is clear from FIGS. 1 and 13.

Release structure is provided to block generally radially outward movement of the second segments 31 (i.e. the triggering means), the release structure being axially movable to unblock such radially outward movement of the segments at such time as sudden unlocking of the overall device is desired. In the example, the release structure includes a load release sleeve 34 having a blocking end portion 34*a* that extends about the second segments 31 to block their radially outward movement. A transverse pin 35 extends through a slot 36 in the piston 23 to have beam connection at its opposite ends to reduced diameter extents 34*b* of the sleeve 34, for transmitting axial "release" loading to the sleeve 34, pulling it to the right relative to the piston in order to displace blocking portion 34*a* of the sleeve 34 out of blocking relation to the second segments. As a result, sudden sequential release and movement of parts 31, 28 and 18 effects sudden de-coupling of the piston from the cylinder 10, whereby the piston may move relatively to the right, or the cylinder relatively to the left, or both. Portion 34*a* has a bore 34*c* which extends about the arcuate outer surfaces 31*e* of the segments 31.

It will be noted that parts 28, 33 and 34 are mutually frusto-conically tapered to nest at interfaces 40 and 41, in FIG. 1, for limiting axial lock-up positioning of these parts. Finally, the oppositely projecting ends of the retainers 20 and 32 are seen as radially overlapping in FIG. 13, contributing to extreme compactness while allowing independent radial movement of the segments and their relative adjustment to the interengagement surfaces which they contact, as described above.

Note in FIG. 1 that bearing 22 pilots at bore 50 on surface 51 of the piston 23. In FIG. 4 the outer diameter of bearing 22 is less than the bore diameter of seat ring 14. Also, in FIG. 1 a spring 53 yieldably urges sleeve 34 to the left, keeping portion 34*a* about segments 31.

We claim:

1. In a mechanical locking device having an axis, the combination comprising (a) main lock means blocking axial travel of a load exerting component, and being generally radially movable to unblock said axial travel, (b) holder means blocking said general radial movement of the main lock means, and being axially movable to unblock said generally radial movement of the main lock means, (c) triggering means blocking said axial movement of the holder means, and being generally radially movable to unblock said axial movement of the holder means, (d) release structure blocking said generally radial movement of the triggering means, and being movable to unblock said generally radial movement of the triggering means, (e) at least one of said main lock means and said triggering means comprising multiple elements spaced about said axis for independent radial movement, said elements comprising circularly spaced segments which extend arcuately about said axis, (f) and a retainer defining slots spaced about said axis and in which said elements are positioned for said independent radial movement thereof.

2. In a mechanical locking device having an axis, the combination comprising (a) main lock means including multiple first elements spaced about said axis to block axial travel of a load exerting component, the elements being independently radially movable to unblock said load exerting component axial travel, (b) holder means blocking said radial movement of the elements, the holder means being axially movable to unblock said first element radial movement, (c) triggering means including multiple second elements blocking said axial movement of the holder means, the second elements being independently radially movable to unblock said axial movement of the holder means, (d) release structure blocking said radial movement of the second elements, said structure being axially movable to unblock said second element radial movement, and (e) a first retainer defining slots spaced about said axis and in which said first elements are located for such radial movement.

3. The combination of claim 2 wherein said holder means comprises a sleeve, and said first elements and said sleeve have first frusto-conical interengagement shoulders which are relatively shiftable in response to said sleeve axial movement to enable said unblocking of said radial movement of the first elements.

4. The combination of claim 3 wherein said sleeve and said second elements have second frusto-conical interengagement shoulders which are relatively shiftable in response to said radial movement of the second elements to enable said sleeve axial movement.

5. The combination of claim 2 including a second retainer defining slots spaced about said axis and in which said second elements are located for said radial movement.

6. The combination of claim 5 wherein said first and second retainers extend axially oppositely toward one another.

7. The combination of claim 4 wherein said second elements and said release structure have third interengagement shoulders which are relatively shiftable in response to said release structure axial movement, to enable said radial movement of the second elements.

8. The combination of claim 2 wherein said structure has a blocking portion that extends about said second elements to block radially outward movement thereof.

9. The combination of claim 8 wherein said second elements are spaced about said holder means to block said axial movement thereof.

10. The combination of claim 9 wherein said first elements are spaced about said holder means which blocks radially inward movement of the first elements.

11. The combination of claim 1 wherein the first elements have shoulders to engage a load shoulder on said component and to shift relative thereto in response to said radial movement of the first elements to release said load shoulder for axial movement.

12. The combination of claim 11 including a thrust bearing engaging said first elements to transfer axial loading exerted by the first elements in response to load exertion on said first elements by the load shoulder.

13. In a mechanical locking device having an axis, the combination comprising (a) main lock means blocking axial travel of a load exerting component, and being generally radially movable to unblock said axial travel, (b) holder means blocking said general travel movement of the main lock means, and being axially movable to unblock said generally radial movement of the main lock means, (c) triggering means blocking said axial movement of the holder means, and being generally radially movable to unblock said axial movement of the holder means, (d) release structure blocking said generally radial movement of the triggering means, and being movable to unblock said generally radial movement of the triggering means, (e) at least one of said main lock means and said triggering means comprising multiple elements spaced about said axis for independent and bodily radial movement, said elements comprising circularly spaced segments which are spaced about said axis, and retainer means defining guide shoulders adjacent which said elements are positioned for said independent and bodily radial movement thereof.

* * * * *